(12) United States Patent
Mair et al.

(10) Patent No.: US 12,522,358 B1
(45) Date of Patent: Jan. 13, 2026

(54) CONVERTIBLE LAVATORY SYSTEM FOR AN INTERNAL CABIN OF AN AIRCRAFT

(71) Applicant: THE BOEING COMPANY, Arlington, VA (US)

(72) Inventors: Roland D. Mair, Kenmore, WA (US); Gregory Allen Tubbs, Marysville, WA (US); Martin Clive Adams, Everett, WA (US); Paul Addis, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/211,510

(22) Filed: May 19, 2025

Related U.S. Application Data

(60) Provisional application No. 63/711,802, filed on Oct. 25, 2024.

(51) Int. Cl.
  *B64D 11/02* (2006.01)
  *B64D 11/06* (2006.01)

(52) U.S. Cl.
  CPC .......... *B64D 11/02* (2013.01); *B64D 11/0691* (2014.12)

(58) Field of Classification Search
  CPC .. B64D 11/02; B64D 11/0691; B64D 11/0023
  See application file for complete search history.

(56) References Cited

U.S. PATENT DOCUMENTS

| | | | | |
|---|---|---|---|---|
| 6,007,025 A * | 12/1999 | Coughren | ............... | B64D 11/02 |
| | | | | 244/118.5 |
| 6,079,669 A * | 6/2000 | Hanay | ................... | B64D 11/02 |
| | | | | 244/118.5 |
| 6,615,421 B2 * | 9/2003 | Itakura | ................... | B64D 11/02 |
| | | | | 244/118.5 |
| 12,258,127 B2 * | 3/2025 | McIntosh | ............... | B64D 11/02 |
| 12,397,913 B2 * | 8/2025 | Meyer | ................... | B64D 11/02 |
| 2013/0206907 A1 * | 8/2013 | Burrows | ............... | B64D 11/02 |
| | | | | 244/118.5 |

* cited by examiner

*Primary Examiner* — Richard Green
(74) *Attorney, Agent, or Firm* — Joseph M. Butscher; The Small Patent Law Group LLC

(57) ABSTRACT

An aircraft includes an internal cabin, and a lavatory system within the internal cabin. The lavatory system is convertible between a standard configuration and an expanded configuration. The lavatory system includes a first lavatory unit, and a second lavatory unit. One or more doors of one or both of the first lavatory unit or the second lavatory unit are moveable between different positions to provide the standard configuration and the expanded configuration.

18 Claims, 11 Drawing Sheets

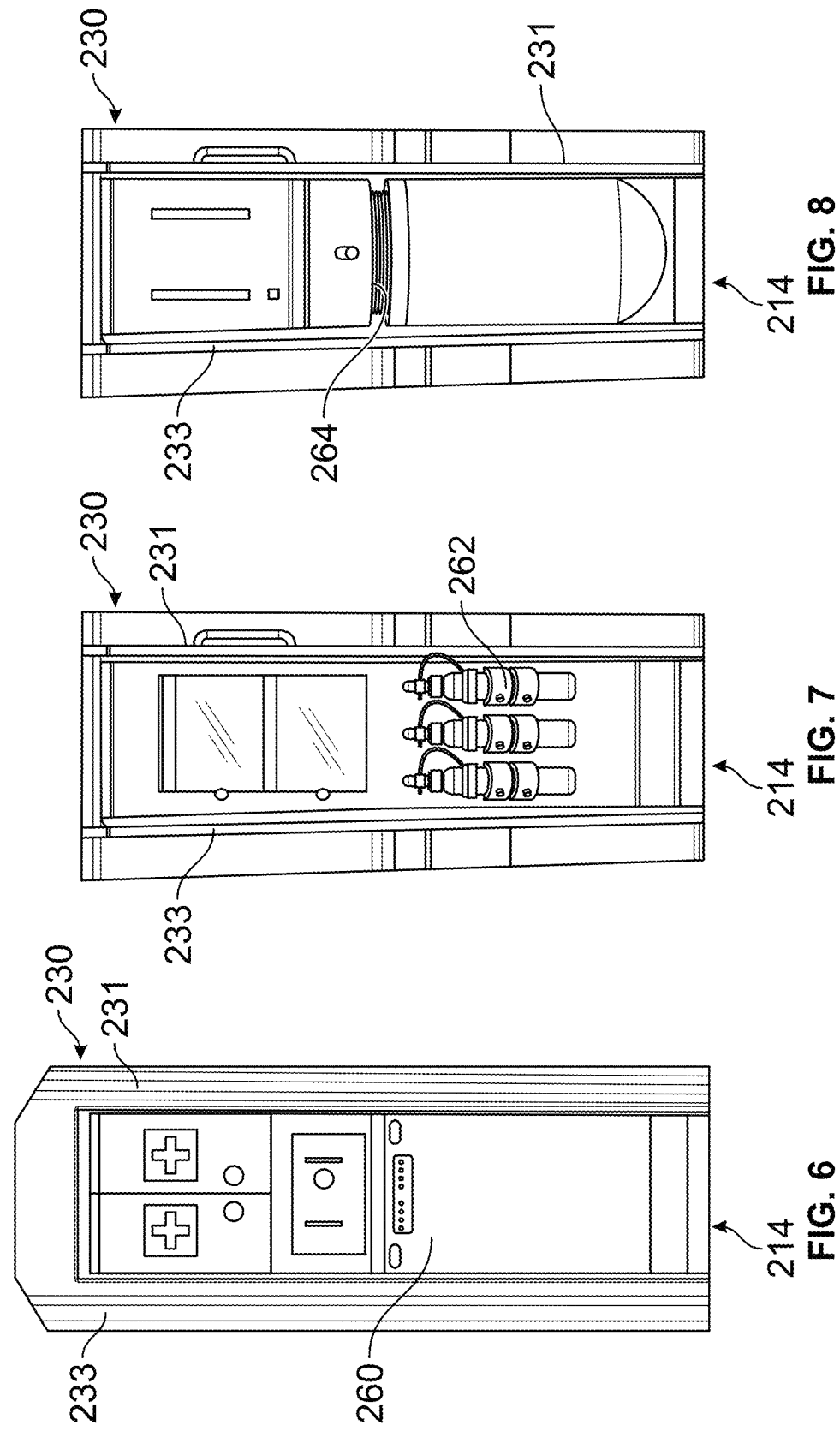

CONVERTIBLE LAVATORY SYSTEM FOR AN INTERNAL CABIN OF AN AIRCRAFT

CROSS-REFERENCE TO RELATED APPLICATION

This application relates to and claims priority benefits from U.S. Provisional Patent Application No. 63/711,802, filed Oct. 25, 2024, which is hereby incorporated by reference in its entirety.

FIELD OF THE DISCLOSURE

Examples of the present disclosure generally relate to lavatory systems for an internal cabin of an aircraft, and more particularly to lavatory systems configured to be converted between different configurations.

BACKGROUND OF THE DISCLOSURE

Commercial aircraft are used to transport passengers and/or cargo between various destinations. A typical commercial aircraft includes an internal cabin, including passenger seating areas, one or more galleys, and one or more lavatories.

Persons of reduced mobility, such as those using wheelchairs onboard a commercial aircraft, may find that onboard lavatories are not easily accessible and useable. For example, a typical lavatory onboard an aircraft may be too small to easily navigate an onboard wheelchair.

Known expanded lavatories utilized on single aisle aircraft typically do not meet market needs. For example, the expanded lavatories substantially impact cabin space, overall seat count, crew workspace, and/or galley capacity. Further, such expanded lavatories may not meet airline and regulatory requirements for persons of reduced mobility.

SUMMARY OF THE DISCLOSURE

A need exists for a lavatory system that is easily accessible and useable by persons of reduced mobility. With that need in mind, certain examples of the present disclosure provide an aircraft including an internal cabin, and a lavatory system within the internal cabin. The lavatory system is convertible between a standard configuration and an expanded configuration. The lavatory system includes a first lavatory unit, and a second lavatory unit. One or more doors of one or both of the first lavatory unit or the second lavatory unit are moveable between different positions to provide the standard configuration and the expanded configuration. In at least one example, the lavatory system is within an aft area of the internal cabin.

In at least one example, the lavatory system further includes a passageway separating the first lavatory unit and the second lavatory unit. The passageway leads to an aisle within the internal cabin.

Each of the first lavatory unit and the second lavatory includes a toilet.

In at least one example, the one or more doors include a first door of the first lavatory unit, and a second door of the second lavatory unit. The first lavatory unit provides a first internal chamber, and the second lavatory unit provides a second internal chamber. The first door is moveable between a first closed position in which the first internal chamber is closed in the standard configuration, and a first open position in which the first internal chamber is open in the standard configuration. The second door is moveable between a second closed position in which the second internal chamber is closed in the standard configuration, and a second open position in which the second internal chamber is open in the standard configuration. In at least one example, the first door is configured to open into the first internal chamber of the first lavatory unit, and the second door is configured to open into the second internal chamber of the second lavatory unit. In at least one example, one or both of the first door or the second door is configured to extend across a passageway between the first lavatory unit and the second lavatory unit to provide the expanded configuration.

In at least one example, the lavatory system further includes an end area between a first end sidewall of the first lavatory unit and a second end sidewall of the second lavatory unit. The end area can include one or more of (a) a cabinet that retains a trash receptacle, (b) emergency equipment, (c) a sink, and/or (d) an attendant seat.

In at least one example, the lavatory system further comprises one or more cabinets and one or more attendant seats secured to one or both of the first lavatory unit or the second lavatory unit.

Certain examples of the present disclosure provide a method including converting the lavatory system between the standard configuration and the expanded configuration.

In at least one example, said converting includes moving a first door of the first lavatory unit into a first closed position in which a first internal chamber of the first lavatory unit is closed in the standard configuration; moving the first door of the first lavatory unit into a first open position in which the first internal chamber is open in the standard configuration; moving a second door of the second lavatory unit into a second closed position in which a second internal chamber of the second lavatory unit is closed in the standard configuration; and moving the second door of the second lavatory unit into a second open position in which the second internal chamber is open in the standard configuration.

In at least one example, the method also includes extending one or both of the first door or the second door across a passageway between the first lavatory unit and the second lavatory unit to provide the expanded configuration.

In at least one example, the method also includes retaining one or more of a trash receptacle, emergency equipment, or a sink within an end area between a first end sidewall of the first lavatory unit and a second end sidewall of the second lavatory unit.

BRIEF DESCRIPTION OF THE DRAWINGS

FIG. 6 illustrates a front view of an end area of a passageway of the lavatory system, according to an example of the present disclosure.

FIG. 7 illustrates a front view of an end area of a passageway of the lavatory system, according to an example of the present disclosure.

FIG. 8 illustrates a front view of an end area of a passageway of the lavatory system, according to an example of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a lavatory system for an internal cabin of a vehicle, such as a commercial aircraft. The lavatory is configured to provide easy accessibility to persons of reduced mobility. In at least one example, the lavatory is located at an aft area of the internal cabin, and provides increased space when converted from a standard two-lavatory configuration to a converted expanded space configuration, while minimizing or otherwise reducing cabin configuration and operational impact. When the lavatory system is deployed into the converted expanded configuration, an entryway area/space is utilized to create a single large lavatory that offers increased space to support users with disabilities, including those who require independent or assisted transfer from an onboard wheelchair.

As described herein, a vehicle, such as an aircraft, includes an internal cabin, and a lavatory system within the internal cabin. The lavatory system is convertible between a standard configuration and an expanded configuration. In at least one example, the lavatory system includes a first lavatory unit, and a second lavatory unit. One or more doors of one or both of the first lavatory unit or the second lavatory unit are moveable between different positions to provide the standard configuration and the expanded configuration. In at least one example, the lavatory system is within an aft area of the internal cabin.

Figure 1:
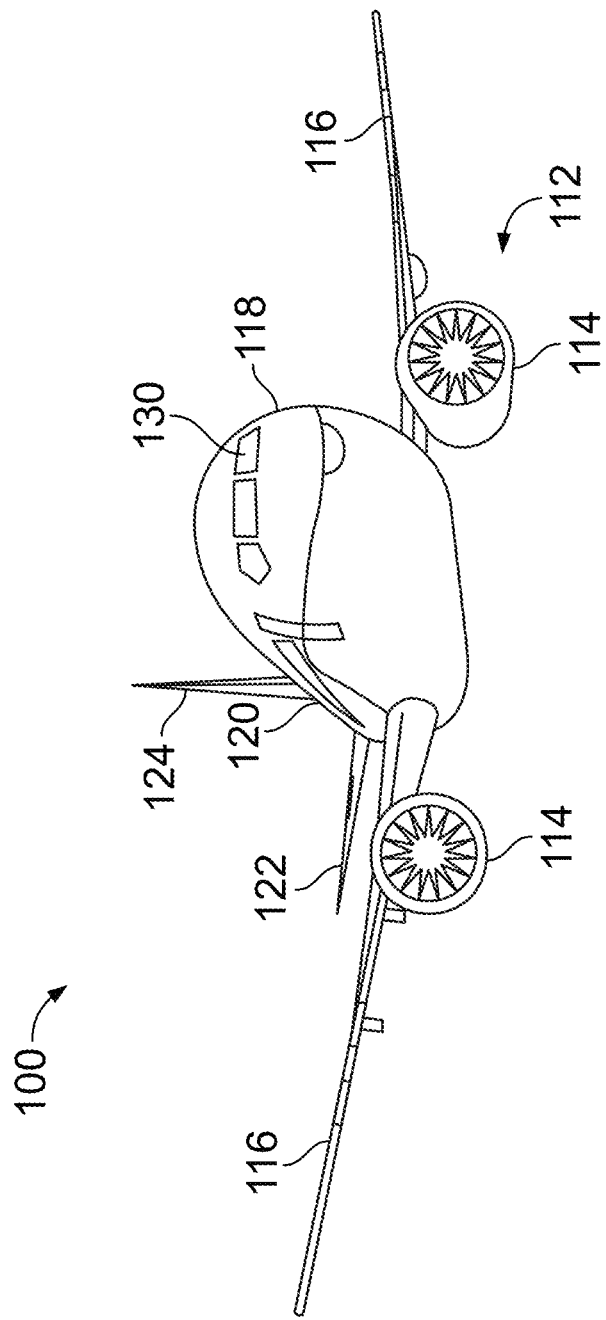
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like.

The aircraft 100 shown in FIG. 1 is merely exemplary. The aircraft 100 can be sized, shaped, and configured differently than shown. Optionally, examples of the present disclosure can be used with various other types of vehicles, such as land-based vehicles (for example, buses, train cars, and the like), water-based vehicles (such as cruise ships), spaced-based vehicle, and the like.

Figure 2:
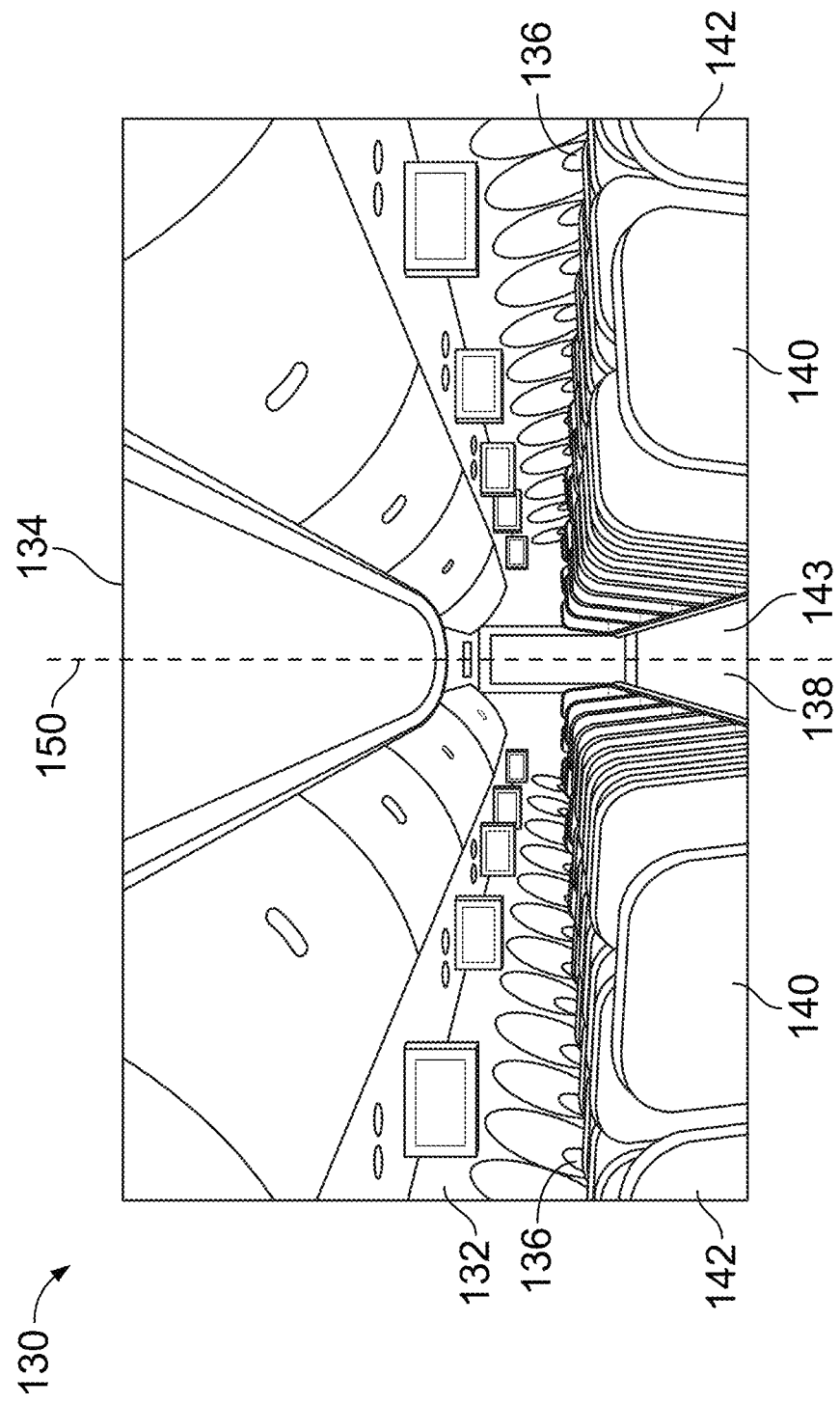
FIG. 2 illustrates a perspective interior view of an internal cabin of an aircraft, according to an example of the present disclosure.

FIG. 2 illustrates a perspective interior view of an internal cabin 130 of an aircraft, according to an example of the present disclosure. The internal cabin 130 includes outboard walls 132 and a ceiling 134. Windows 136 may be formed within the outboard walls 132. A floor 138 supports rows of seats 140. As shown in FIG. 2, a row 142 may include three seats 140 on either side of an aisle 143. However, the row 142 may include more or less seats 140 than shown. Additionally, the internal cabin 130 may include more aisles than shown.

As used herein, the term "outboard" means a position that is further away from a central longitudinal plane 150 of the internal cabin 130 as compared to another component. The term "inboard" means a position that is closer to the central longitudinal plane 150 of the internal cabin 130 as compared to another component.

Figure 3:
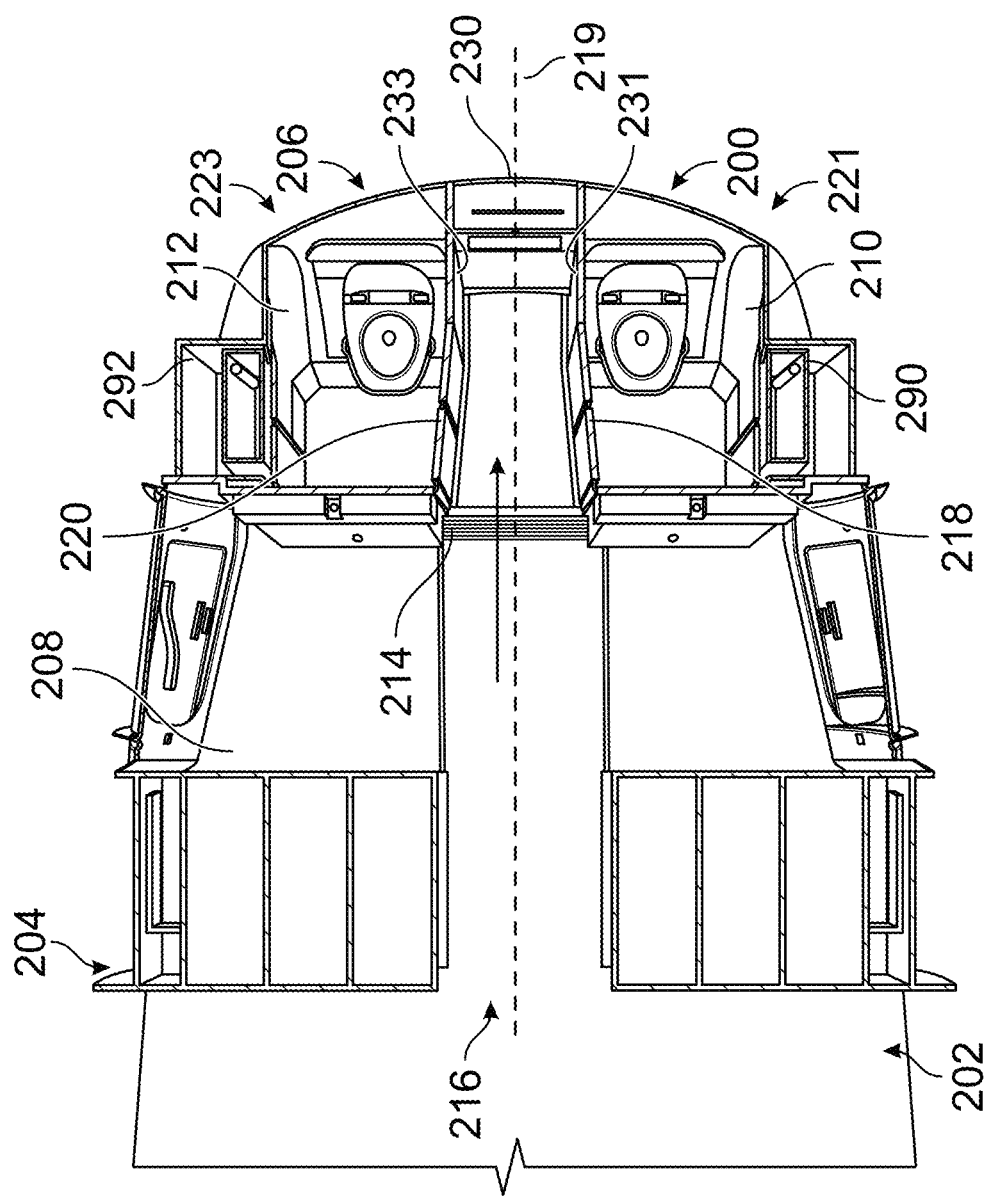
FIG. 3 illustrates a top view of a lavatory system in a standard configuration within an internal cabin of an aircraft, according to an example of the present disclosure.

FIG. 3 illustrates a top view of a lavatory system 200 in a standard configuration within an internal cabin 202 of an aircraft 204, according to an example of the present disclosure. In at least one example, the lavatory system 200 is located in an aft area 206 of the internal cabin 202, behind rows of seats, and a galley 208, for example.

The lavatory system 200 includes a first lavatory unit 210 and a second lavatory unit 212 separated by a passageway 214 that leads to an aisle 216. In at least one example, the internal cabin 202 includes a single aisle 216 that leads to the passageway 214. As another example, the internal cabin 202 includes multiple lavatory systems 200, each of which has a passageway 214, which leads to a different aisle 216.

Each of the first lavatory unit 210 and the second lavatory unit 212 includes a toilet, sink, and the like. Each of the first lavatory unit 210 and the second lavatory 212 includes a door 218 and 220, respectively, which leads to the passageway 214 when opened.

As shown, the lavatory system 200 can be symmetrical with respect to a longitudinal plane 219 of the aisle 216 (and/or the internal cabin 202). The passageway 214 is longitudinally aligned with the longitudinal plane 219. The first lavatory unit 210 is disposed to a first side 221 of the longitudinal plane 219, while the second lavatory unit 212 is disposed to a second side 223 (opposite from the first side 221) of the longitudinal plane 219. The first lavatory unit 210 and the second lavatory unit 212 are outboard from the longitudinal plane 219.

Figure 4:
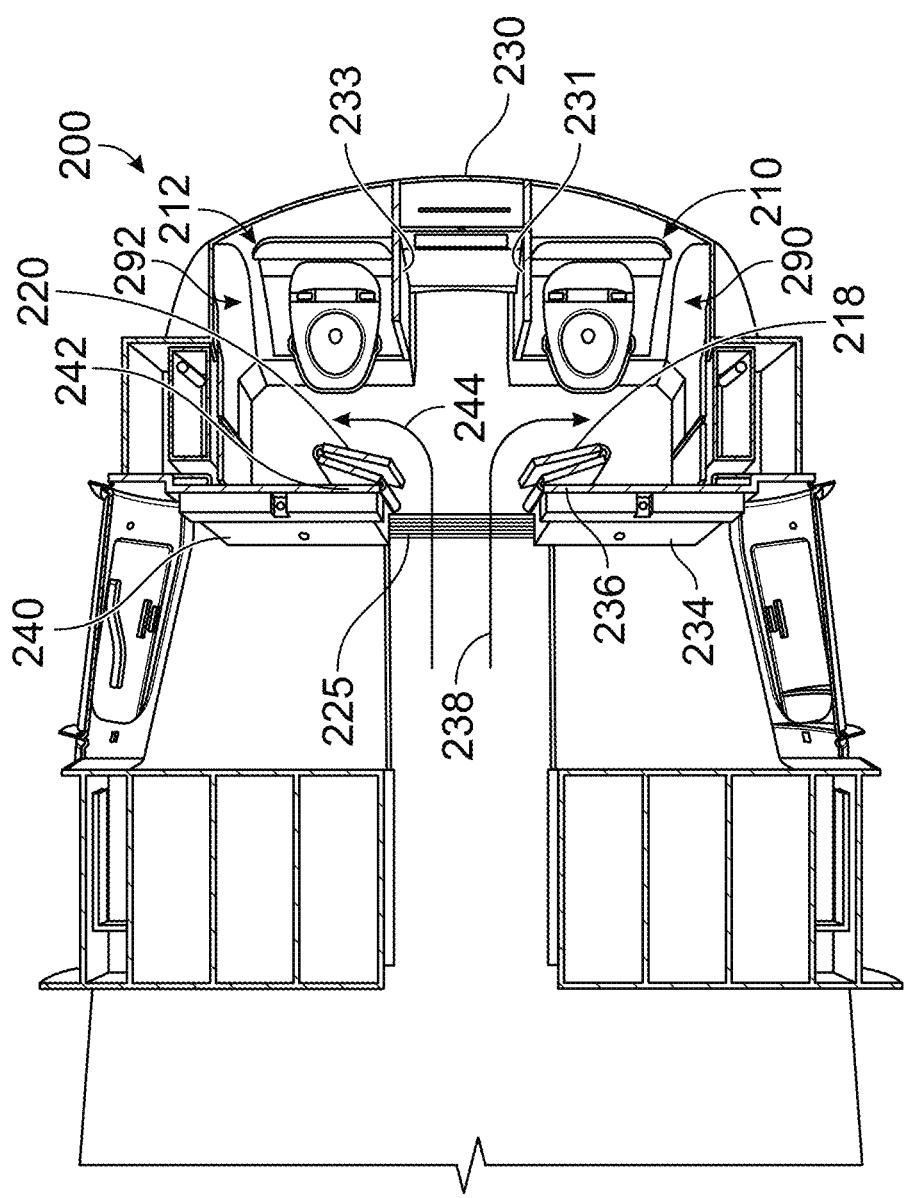
FIG. 4 illustrates a top view of the lavatory system in the standard configuration having doors opened to allow access into a first lavatory unit and a second lavatory unit.

FIG. 4 illustrates a top view of the lavatory system 200 in the standard configuration having the doors 218 and 220 opened to allow access into the first lavatory unit 210 and the second lavatory unit 212. As shown, the doors 218 and 220 can be opened in first directions, such as into the first lavatory unit 210 and the second lavatory unit 212, respectively, to allow access into the individual lavatory units 210 and 212. The doors 218 and 220 can be folding doors having panels that fold about a central vertical axis.

The door 218 is pivotally coupled to a front wall 234 at a pivot axis 236 proximate to the passageway 214. As shown, the door 218 is configured to pivot inwardly about the pivot axis 236 into the first lavatory unit 210 in the direction of arc 238.

The door 220 is pivotally coupled to a front wall 240 at a pivot axis 242 proximate to the passageway 214 (opposite from the door 218). As shown, the door 220 is configured to pivot inwardly about the pivot axis 242 into the second lavatory unit 212 in the direction of arc 244.

Referring to FIGS. 3 and 4, the first lavatory unit 210 provides a first internal chamber 290, and the second lavatory unit 212 provides a second internal chamber 292. The door 218 is moveable between a first closed position (shown in FIG. 3) in which the first internal chamber 290 is closed in the standard configuration, and a first open position (shown in FIG. 4) in which the first internal chamber 290 is open in the standard configuration. Similarly, the door 220 is moveable between a second closed position (shown in FIG. 3) in which the second internal chamber 292 is closed in the standard configuration, and a second open position (shown in FIG. 3) in which the second internal chamber 292 is open in the standard configuration.

Figure 5:
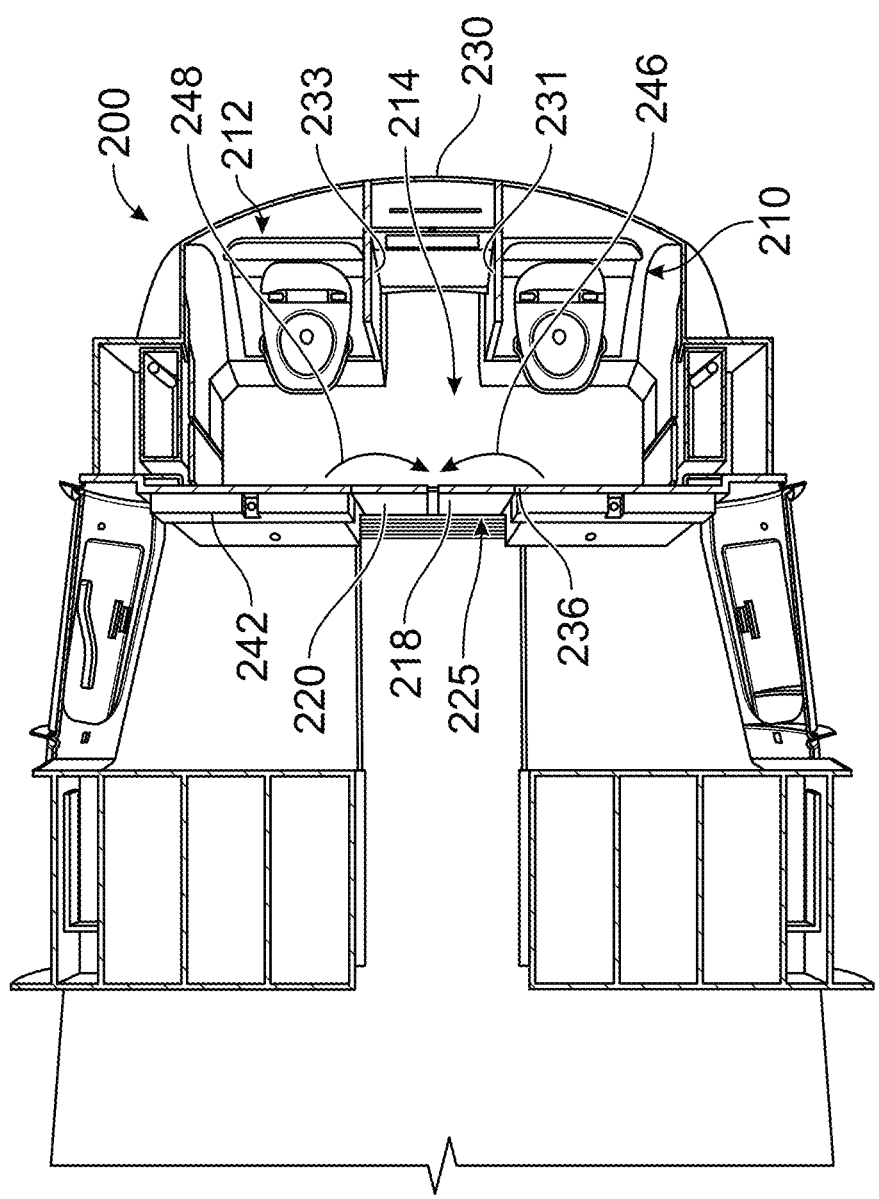
FIG. 5 illustrates a top view of the lavatory system in an expanded configuration, according to an example of the present disclosure.

FIG. 5 illustrates a top view of the lavatory system 200 in an expanded configuration, according to an example of the present disclosure. In order to convert the lavatory system 200 into the expanded configuration, one or both of the doors 218 and 220 of the first lavatory unit 210 and the second lavatory unit 212, respectively, are opened in second directions, such as away from the respective units 210 and 212, to close an opening 225 into the passageway 214, thereby providing an expanded lavatory space. In particular, the door 218 is pivoted about the pivot axis 236 in the direction of arc 246 (which is opposite from the direction of arc 238), while the door 220 is pivot about the pivot axis 242 in the direction of arc 248 (which is opposite from the direction of arc 244). In at least one example, the doors 218 and 220 can removably connect together within the opening 225 of the passageway 214 to provide the expanded configuration. Optionally, one of the doors 218 or 220 can be pivoted into the position shown in FIG. 5, and extend across the entire opening 225 (while the other door 218 or 220 remains in a position as shown in FIG. 4).

Referring to FIGS. 3-5, the lavatory system 200 includes an end area 230 between an end sidewall 231 of the first lavatory unit 210 and an end sidewall 233 of the second lavatory unit 212. In at least one example, the end area 230 provides storage for trash, emergency equipment, a sink, or the like, which is accessible when the lavatory system 200 is in an unexpanded, standard configuration.

FIG. 6 illustrates a front view of the end area 230 of the passageway 214 of the lavatory system 200, according to an example of the present disclosure. In at least one example, the end area 230 includes a cabinet 260, which retains a trash receptacle, for example.

FIG. 7 illustrates a front view of an end area 230 of a passageway 214 of the lavatory system 200, according to an example of the present disclosure. In at least on example, the end area 230 includes emergency equipment 262, such as oxygen tanks, defibrillators, first aid kits, and/or the like. The end area 230 can also include the cabinet 260 for retaining the trash receptacle (as shown in FIG. 6).

FIG. 8 illustrates a front view of the end area 230 of the passageway 214 of the lavatory system 200, according to an example of the present disclosure. In at least one example, the end area 230 includes a sink 264 and faucet. The end area 230 can include one or both of the cabinet 260 (shown in FIG. 6) and/or the emergency equipment 262 (shown in FIG. 7).

Referring to FIGS. 6-8, the end area 230 can optionally or additionally include a stowage area, and/or an attendant seat (in particular, a forward-facing attendant seat so that a seated attendant can view into the aisle and passenger seating area).

Figure 9:
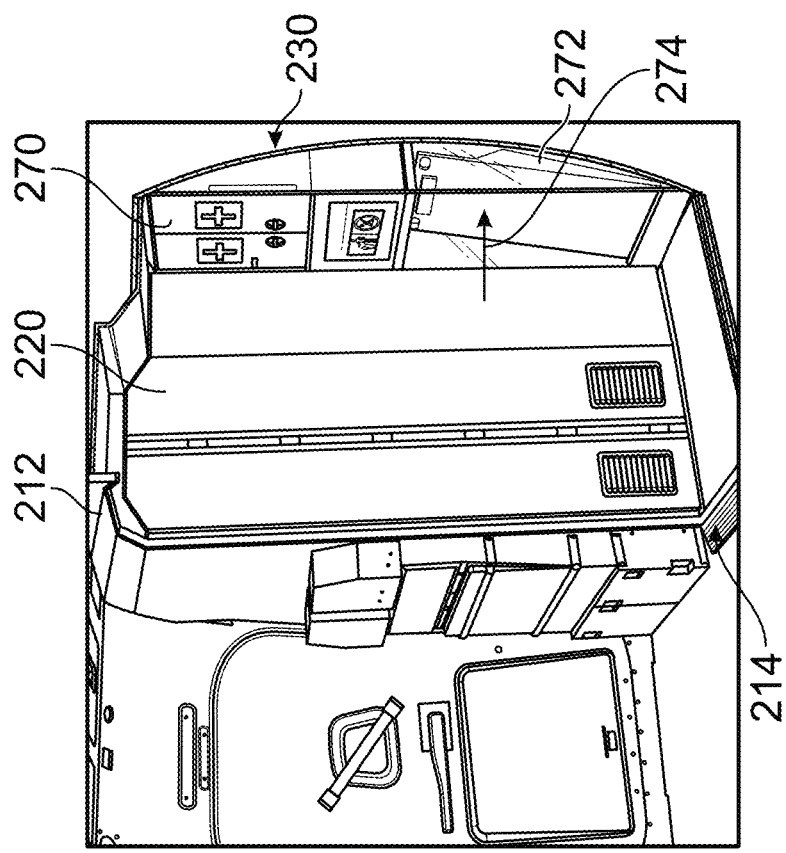
FIG. 9 illustrates an isometric view of the end area, according to an example of the present disclosure.

FIG. 9 illustrates an isometric view of the end area 230, according to an example of the present disclosure. As shown, the end area 230 can includes upper stowage cabinets 270, and a lower retaining bin 272. The upper stowage cabinets 270 can be configured to retain various components, such as emergency equipment. The lower retaining bin 272 can be a trash receptacle. As shown, the lower retaining bin 272 can be configured to be inwardly pivoted in the direction of arrow 274. Such movement can be used to compact trash retained within the retaining bin 272, and/or to provide additional space within the passageway 214.

Figure 10:
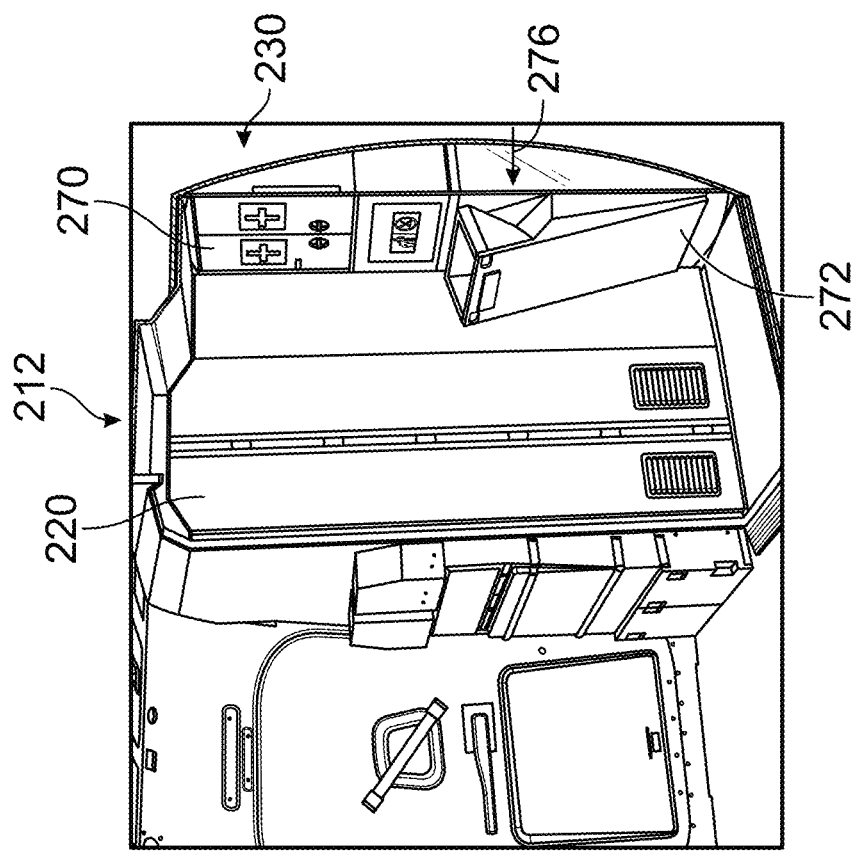
FIG. 10 illustrates an isometric view of the end area, according to an example of the present disclosure.

FIG. 10 illustrates an isometric view of the end area 230, according to an example of the present disclosure. The lower retaining bin 272 can be configured to be outwardly pivoted in the direction of arrow 276 to allow the lower retaining bin 272 to be opened. In this manner, an individual can deposit trash, for example, into the lower retaining bin 272.

Figure 11:
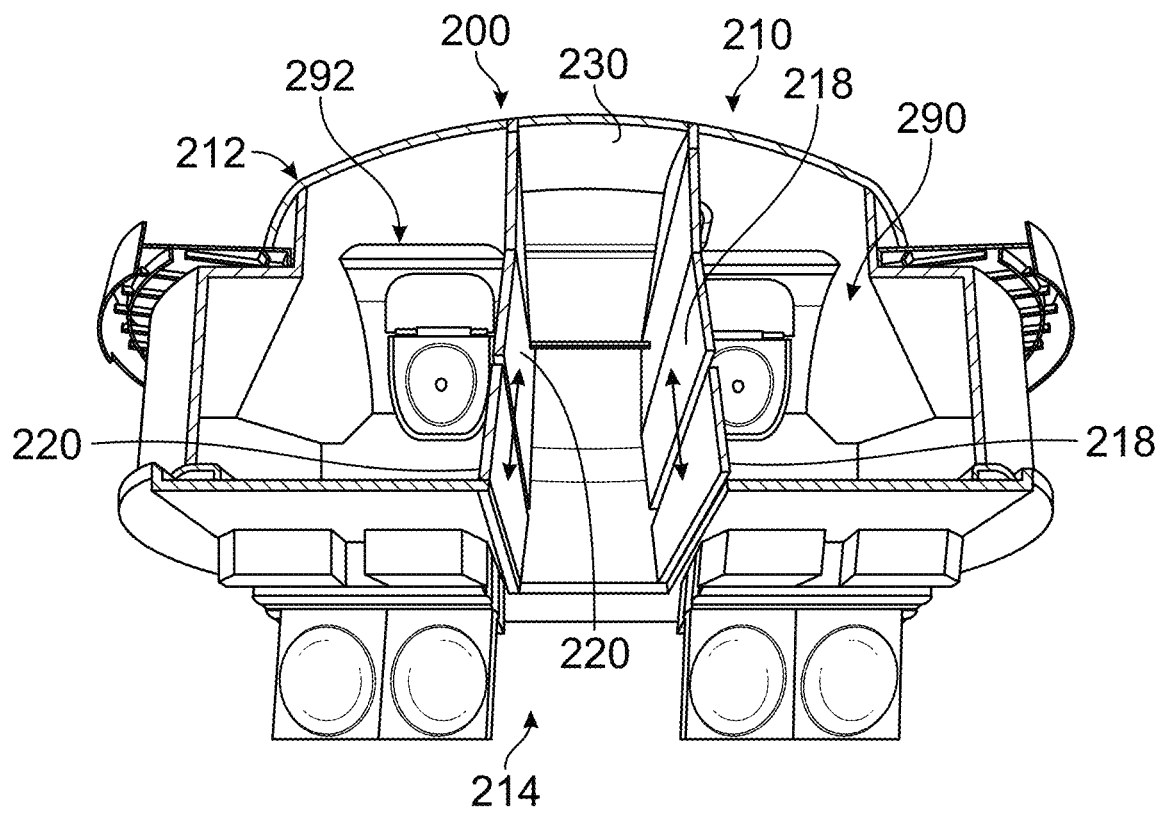
FIG. 11 illustrates an isometric internal view of the lavatory system in the standard configuration, according to an example of the present disclosure.

FIG. 11 illustrates an isometric internal view of the lavatory system 200 in the standard configuration, according to an example of the present disclosure. In the standard configuration, the doors 218 and 220 of the first lavatory unit 210 and the second lavatory unit 212, respectively, are closed, thereby providing closed internal chambers 290 and 292, respectively.

Figure 12:
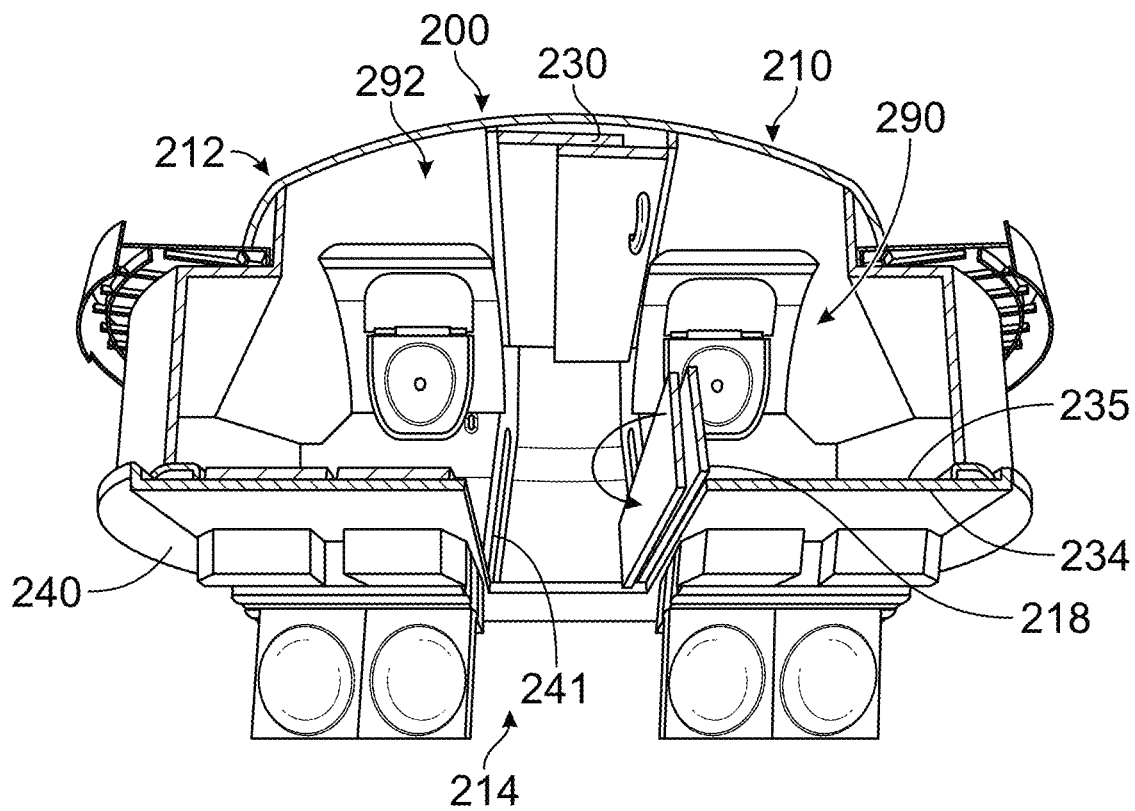
FIG. 12 illustrates an isometric internal view of the lavatory system having a door in an open position, and a door in a partially open position, according to an example of the present disclosure.

FIG. 12 illustrates an isometric internal view of the lavatory system 200 having the door 220 in an open position, and the door 218 in a partially open position, according to an example of the present disclosure. As shown, the door 220 can be folded against an interior surface 241 of the front wall 240. The door 218 can be folded onto itself about the central vertical axis, thereby providing a reduced space opening into the internal chamber 290. Optionally, the door 218 can be folded against an interior surface 235 of the front wall 234, while the door 220 can be in a partially open position.

Figure 13:
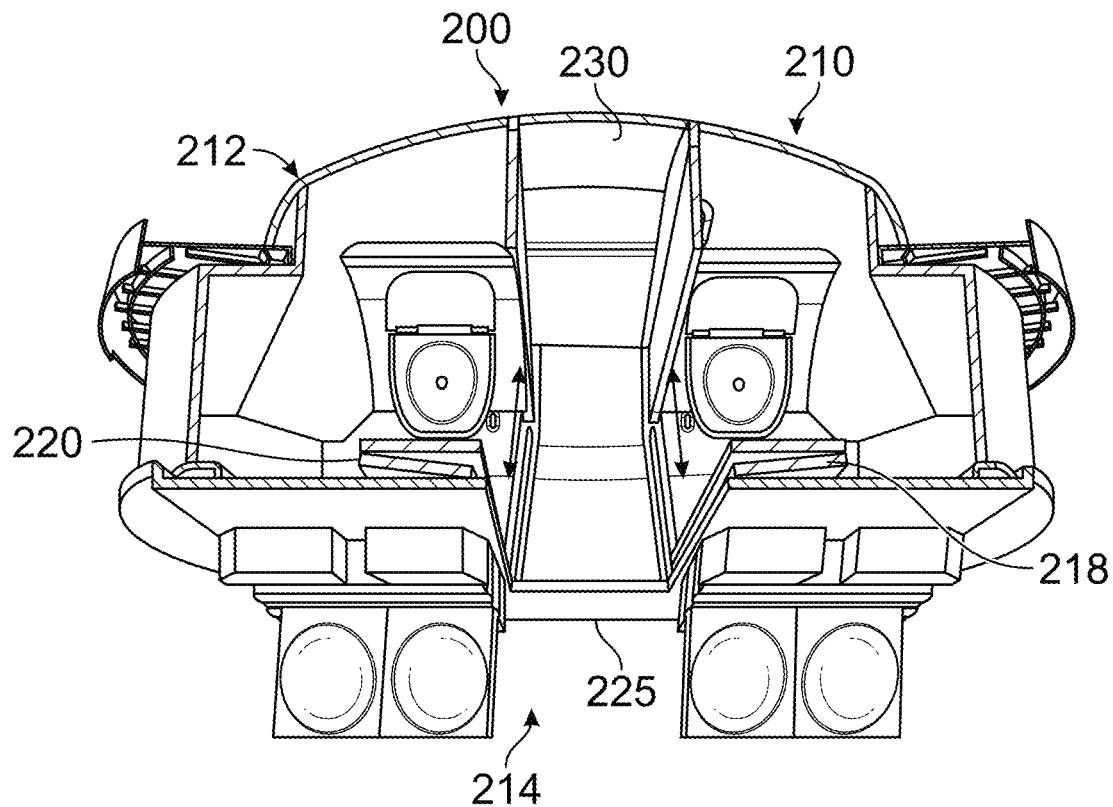
FIG. 13 illustrates an isometric internal view of the lavatory system having the doors in open positions, according to an example of the present disclosure.

FIG. 13 illustrates an isometric internal view of the lavatory system 200 having the doors 218 and 220 in open positions, according to an example of the present disclosure. When the doors 218 and 220 are in open positions, the internal chambers 290 and 292 are open and accessible.

Figure 14:
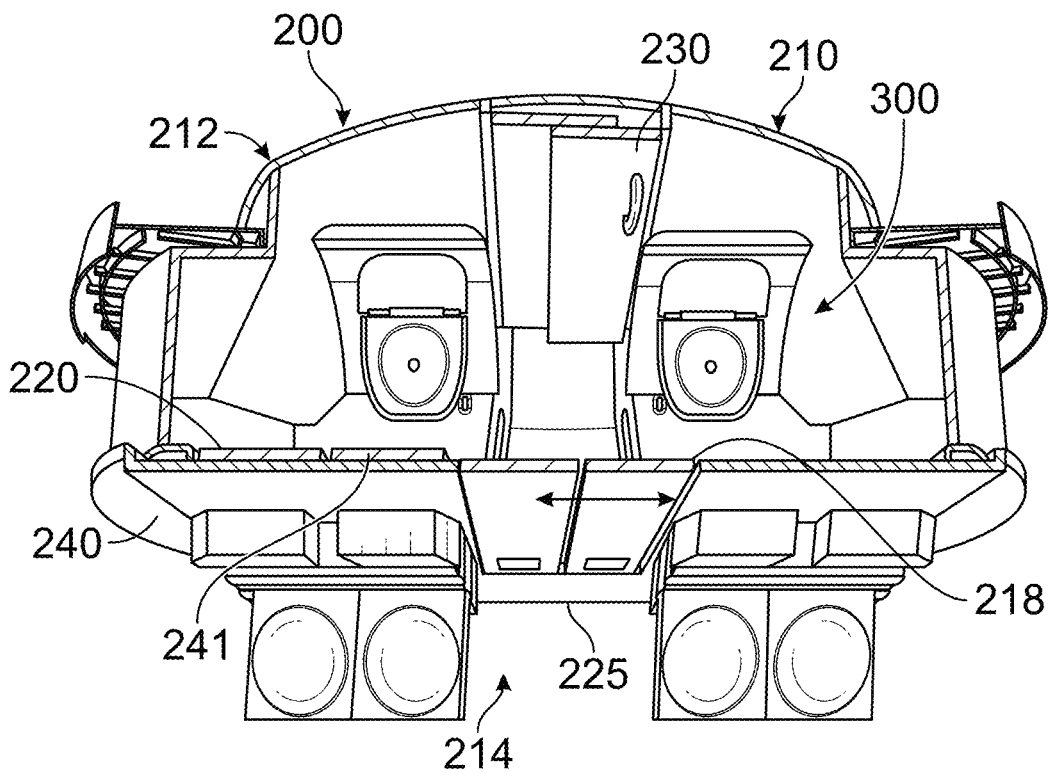
FIG. 14 illustrates an isometric internal view of the lavatory system in the expanded configuration, according to an example of the present disclosure.

FIG. 14 illustrates an isometric internal view of the lavatory system 200 in the expanded configuration, according to an example of the present disclosure. As shown, the door 220 is folded against the interior surface 241 of the front wall 240, and the door 218 extends across the opening 225 of the passageway 214, thereby enclosing an expanded internal chamber 300.

Figure 15:
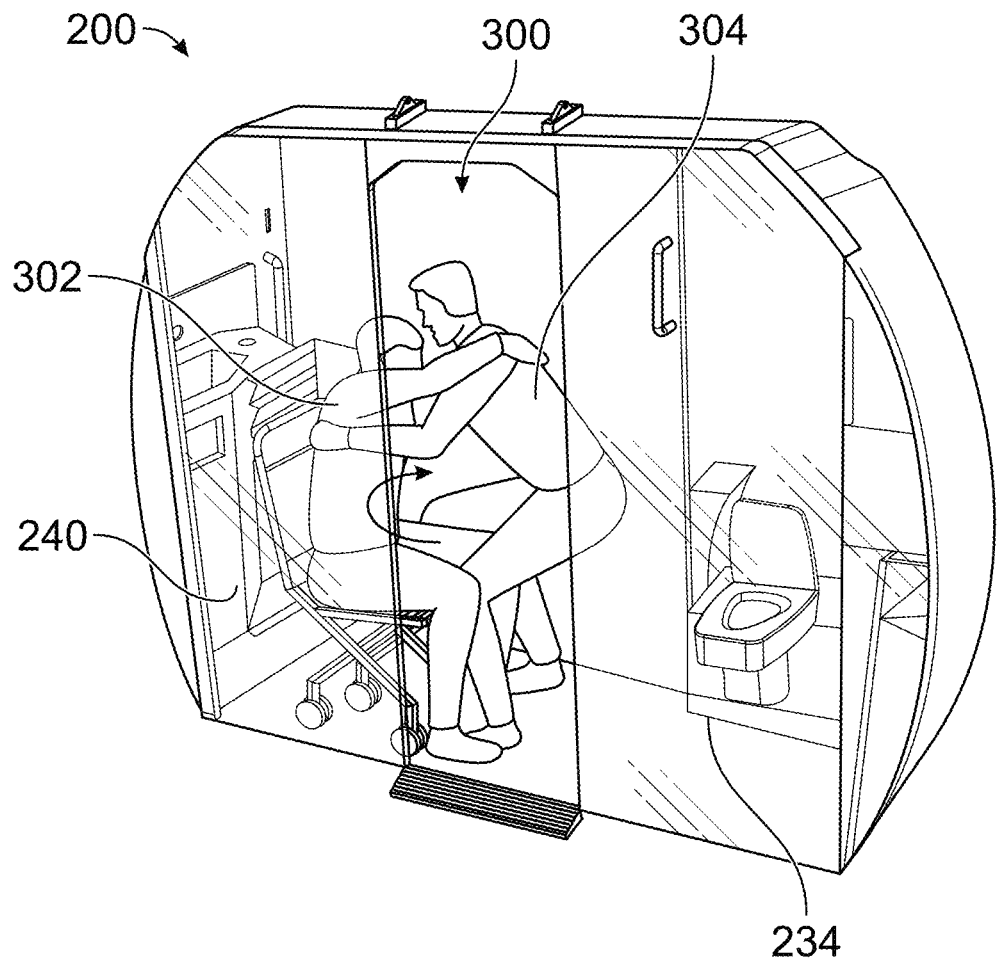
FIG. 15 illustrates an isometric front view of the lavatory system in the expanded configuration, according to an example of the present disclosure.

FIG. 15 illustrates an isometric front view of the lavatory system 200 in the expanded configuration, according to an example of the present disclosure. For the sake of clarity, the front walls 234 and 240 are shown transparent. In the expanded configuration, the lavatory system 200 provides the expanded internal chamber 300, which allows greater space for movement to allow for an individual 302 to be assisted by another individual 304.

Figure 16:
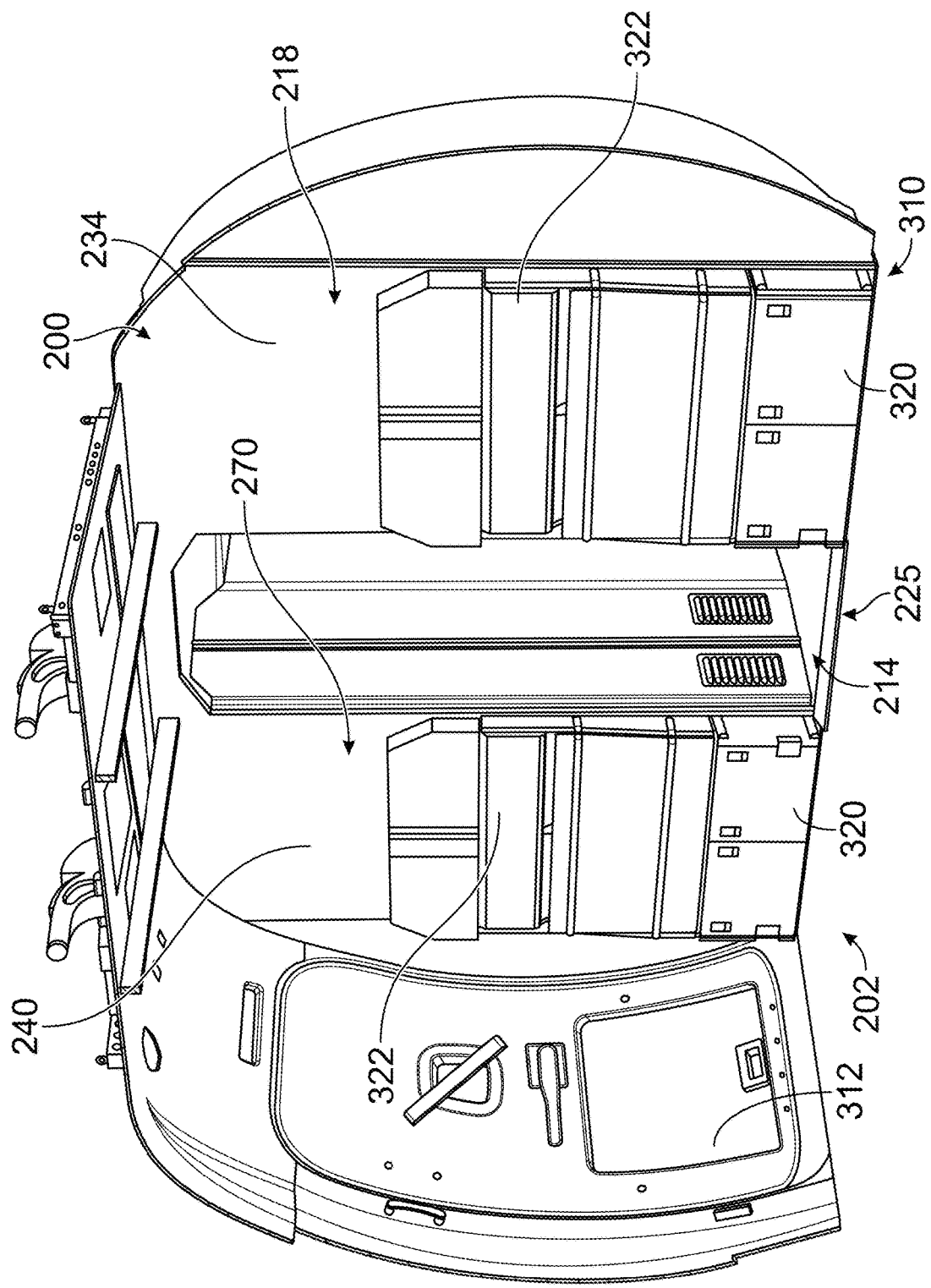
FIG. 16 illustrates an isometric front view of the lavatory system, according to an example of the present disclosure.

FIG. 16 illustrates an isometric front view of the lavatory system 200, according to an example of the present disclosure. As noted, the lavatory system 200 can be disposed within an aft end of the internal cabin 202. The passageway 214 can connect to an egress path 310, which leads to an exit door 312.

In at least one example, cabinets 320 and attendant seats 322 can be secured to external surfaces of the front walls 234 and 240. Optionally, the front walls 234 240 may not have cabinets and attendant seats secured thereto.

Referring to FIGS. 1-16, one or more curtains can be deployed to provide additional privacy, such as in relation to crew work, lavatory users, and seating areas. For example, a moveable curtain can be configured to cover the opening 225 of the passageway 214 in addition to the doors 218 and/or 220.

The lavatory system 200 offers unparalleled accessibility for single-aisle aircraft in the aviation industry, and can meet operational requirements for accessible lavatories, with minimal cabin configuration and operational impact. Further, the lavatory system 200 minimizes or otherwise reduces impact to seating density within the internal cabin 202 (and as such does not adversely impact revenue for airlines). Additionally, the lavatory system 200 minimizes or otherwise reduces an impact in relation to galley cart capacity or service levels, and can actually increase such capacity and service. The lavatory system 200 also protects cabin crew workspace and privacy. The lavatory system 200 can be used in single aisle aircraft, or optionally aircraft having multiple aisles.

Certain regulations, such as promulgated by the United States Department of Transportation, require relatively large, accessible lavatories on single aisle aircraft that support an assisted transfer of an individual (such as in relation to a wheelchair and a toilet). The lavatory systems 200 as shown and described herein provide such lavatories. The convertible lavatory systems 200 shown and described herein comply with such regulations while minimizing impacts in relation to performance and cabin configuration.

Further, the disclosure comprises examples according to the following clauses:

Clause 1. An aircraft comprising:
an internal cabin; and
a lavatory system within the internal cabin, wherein the lavatory system is convertible between a standard configuration and an expanded configuration, wherein the lavatory system comprises:
a first lavatory unit; and
a second lavatory unit,
wherein one or more doors of one or both of the first lavatory unit or the second lavatory unit are moveable between different positions to provide the standard configuration and the expanded configuration.

Clause 2. The aircraft of Clause 1, wherein the lavatory system is within an aft area of the internal cabin.

Clause 3. The aircraft of Clauses 1 or 2, wherein the lavatory system comprises a passageway separating the first lavatory unit and the second lavatory unit, wherein the passageway leads to an aisle within the internal cabin.

Clause 4. The aircraft of any of Clauses 1-3, wherein each of the first lavatory unit and the second lavatory comprises a toilet.

Clause 5. The aircraft of any of Clauses 1-4, wherein the one or more doors comprise:
a first door of the first lavatory unit; and
a second door of the second lavatory unit.

Clause 6. The aircraft of Clause 5, wherein the first lavatory unit provides a first internal chamber, and wherein the second lavatory unit provides a second internal chamber, wherein the first door is moveable between a first closed position in which the first internal chamber is closed in the standard configuration, and a first open position in which the first internal chamber is open in the standard configuration, and wherein the second door is moveable between a second closed position in which the second internal chamber is closed in the standard configuration, and a second open position in which the second internal chamber is open in the standard configuration.

Clause 7. The aircraft of Clause 6, wherein the first door is configured to open into the first internal chamber of the first lavatory unit, and wherein the second door is configured to open into the second internal chamber of the second lavatory unit.

Clause 8. The aircraft or Clause 7, wherein one or both of the first door or the second door is configured to extend across a passageway between the first lavatory unit and the second lavatory unit to provide the expanded configuration.

Clause 9. The aircraft of any of Clauses 1-8, wherein the lavatory system further comprises an end area between a first end sidewall of the first lavatory unit and a second end sidewall of the second lavatory unit.

Clause 10. The aircraft of Clause 9, wherein the end area includes a cabinet that retains a trash receptacle.

Clause 11. The aircraft of Clauses 9 or 10, wherein the end area includes emergency equipment.

Clause 12. The aircraft of any of Clauses 9-11, wherein the end area includes a sink.

Clause 13. The aircraft of any of Clauses 9-12, wherein the end area includes an attendant seat.

Clause 14. The aircraft of any of Clauses 1-13, wherein the lavatory system further comprises one or more cabinets and one or more attendant seats secured to one or both of the first lavatory unit or the second lavatory unit.

Clause 15. A method for an aircraft comprising:
an internal cabin; and
a lavatory system within the internal cabin, wherein the lavatory system is convertible between a standard configuration and an expanded configuration, wherein the lavatory system comprises:
a first lavatory unit; and
a second lavatory unit,
wherein one or more doors of one or both of the first lavatory unit or the second lavatory unit are moveable between different positions to provide the standard configuration and the expanded configuration,
the method comprising:
converting the lavatory system between the standard configuration and the expanded configuration.

Clause 16. The method of Clause 15, wherein said converting comprises:

moving a first door of the first lavatory unit into a first closed position in which a first internal chamber of the first lavatory unit is closed in the standard configuration;

moving the first door of the first lavatory unit into a first open position in which the first internal chamber is open in the standard configuration;

moving a second door of the second lavatory unit into a second closed position in which a second internal chamber of the second lavatory unit is closed in the standard configuration; and moving the second door of the second lavatory unit into a second open position in which the second internal chamber is open in the standard configuration.

Clause 17. The method of Clause 16, further comprising extending one or both of the first door or the second door across a passageway between the first lavatory unit and the second lavatory unit to provide the expanded configuration.

Clause 18. The method of any of Clauses 15-17, further comprising retaining one or more of a trash receptacle, emergency equipment, or a sink within an end area between a first end sidewall of the first lavatory unit and a second end sidewall of the second lavatory unit.

Clause 19. An aircraft comprising:
an internal cabin; and
a lavatory system within an aft area of the internal cabin, wherein the lavatory system is convertible between a standard configuration and an expanded configuration, wherein the lavatory system comprises:
a first lavatory unit including a first door, and a first toilet within a first internal chamber, wherein the first door is configured to open into the first internal chamber of the first lavatory unit, wherein the first door is moveable between a first closed position in which the first internal chamber is closed in the standard configuration, and a first open position in which the first internal chamber is open in the standard configuration;
a second lavatory unit including a second door, and a second toilet within a second internal chamber, wherein the second door is configured to open into the second internal chamber of the second lavatory unit, wherein the second door is moveable between a second closed position in which the second internal chamber is closed in the standard configuration, and a second open position in which the second internal chamber is open in the standard configuration;
a passageway separating the first lavatory unit and the second lavatory unit, wherein the passageway leads to an aisle within the internal cabin; and
an end area between a first end sidewall of the first lavatory unit and a second end sidewall of the second lavatory unit, wherein the end area includes a cabinet that retains a trash receptacle, emergency equipment, and a sink,
wherein one or both of the first door or the second door is configured to extend across the passageway between the first lavatory unit and the second lavatory unit to provide the expanded configuration.

Clause 20. The aircraft of Clause 19, wherein the lavatory system further comprises one or more cabinets and one or more attendant seats secured to each of the first lavatory unit and the second lavatory unit.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A lavatory system configured for an internal cabin of an aircraft, lavatory system comprising:
a first lavatory unit; and
a second lavatory unit,
wherein the lavatory system is convertible between a standard configuration and an expanded configuration, wherein the lavatory system in both the standard configuration and expanded configuration is configured to be usable, and wherein one or more doors of one or both of the first lavatory unit or the second lavatory unit are moveable between different positions to provide the standard configuration and the expanded configuration;

wherein one or both of a first door of the first lavatory unit, of the one or more doors, or a second door of the second lavatory unit, of the one or more doors, is configured to extend across a passageway between the first lavatory unit and the second lavatory unit to provide the expanded configuration.

2. The lavatory system of claim 1, wherein the lavatory system is configured to be within an aft area of the internal cabin.

3. The lavatory system of claim 1, wherein the lavatory system further comprises the passageway separating the first lavatory unit and the second lavatory unit, wherein the passageway is configured to lead to an aisle within the internal cabin.

4. The lavatory system of claim 1, wherein each of the first lavatory unit and the second lavatory comprises a toilet.

5. The lavatory system of claim 1, wherein the one or more doors comprise:
the first door of the first lavatory unit; and
the second door of the second lavatory unit.

6. The lavatory system of claim 5, wherein the first lavatory unit provides a first internal chamber, and wherein the second lavatory unit provides a second internal chamber, wherein the first door is moveable between a first closed position in which the first internal chamber is closed in the standard configuration, and a first open position in which the first internal chamber is open in the standard configuration, and wherein the second door is moveable between a second closed position in which the second internal chamber is closed in the standard configuration, and a second open position in which the second internal chamber is open in the standard configuration.

7. The lavatory system of claim 6, wherein the first door is configured to open into the first internal chamber of the first lavatory unit, and wherein the second door is configured to open into the second internal chamber of the second lavatory unit.

8. The lavatory system of claim 1, further comprising an end area between a first end sidewall of the first lavatory unit and a second end sidewall of the second lavatory unit.

9. The lavatory system of claim 8, wherein the end area includes a cabinet that retains a trash receptacle.

10. The lavatory system of claim 8, wherein the end area includes emergency equipment.

11. The lavatory system of claim 8, wherein the end area includes a sink.

12. The lavatory system of claim 8, wherein the end area includes an attendant seat.

13. The lavatory system of claim 1, further comprising one or more cabinets and one or more attendant seats secured to one or both of the first lavatory unit or the second lavatory unit.

14. A method for an aircraft comprising:
an internal cabin; and
a lavatory system within the internal cabin, wherein the lavatory system is convertible between a standard configuration and an expanded configuration, wherein the lavatory system in both the standard configuration and expanded configuration is configured to be usable, wherein the lavatory system comprises:
a first lavatory unit; and
a second lavatory unit,
wherein one or more doors of one or both of the first lavatory unit or the second lavatory unit are moveable between different positions to provide the standard configuration and the expanded configuration,
the method comprising:
converting the lavatory system between the standard configuration and the expanded configuration;
extending one or both of a first door of the first lavatory unit, of the one or more doors, or a second door of the second lavatory unit, of the one or more doors, across a passageway between the first lavatory unit and the second lavatory unit to provide the expanded configuration.

15. The method of claim 14, wherein said converting comprises:
moving the first door of the first lavatory unit into a first closed position in which a first internal chamber of the first lavatory unit is closed in the standard configuration;
moving the first door of the first lavatory unit into a first open position in which the first internal chamber is open in the standard configuration;
moving the second door of the second lavatory unit into a second closed position in which a second internal chamber of the second lavatory unit is closed in the standard configuration; and
moving the second door of the second lavatory unit into a second open position in which the second internal chamber is open in the standard configuration.

16. The method of claim 14, further comprising retaining one or more of a trash receptacle, emergency equipment, or a sink within an end area between a first end sidewall of the first lavatory unit and a second end sidewall of the second lavatory unit.

17. An aircraft comprising:
an internal cabin; and
a lavatory system within an aft area of the internal cabin, wherein the lavatory system is convertible between a standard configuration and an expanded configuration, wherein the lavatory system in both the standard configuration and expanded configuration is configured to be usable, wherein the lavatory system comprises:
a first lavatory unit including a first door, and a first toilet within a first internal chamber, wherein the first door is configured to open into the first internal chamber of the first lavatory unit, wherein the first door is moveable between a first closed position in which the first internal chamber is closed in the standard configuration, and a first open position in which the first internal chamber is open in the standard configuration;
a second lavatory unit including a second door, and a second toilet within a second internal chamber, wherein the second door is configured to open into the second internal chamber of the second lavatory unit, wherein the second door is moveable between a second closed position in which the second internal chamber is closed in the standard configuration, and a second open position in which the second internal chamber is open in the standard configuration;
a passageway separating the first lavatory unit and the second lavatory unit,
wherein the passageway leads to an aisle within the internal cabin; and
an end area between a first end sidewall of the first lavatory unit and a second end sidewall of the second lavatory unit, wherein the end area includes a cabinet that retains a trash receptacle, emergency equipment, and a sink,
wherein one or both of the first door or the second door is configured to extend across the passageway between the first lavatory unit and the second lavatory unit to provide the expanded configuration.

18. The aircraft of claim 17, wherein the lavatory system further comprises one or more cabinets and one or more attendant seats secured to each of the first lavatory unit and the second lavatory unit.

* * * * *